United States Patent [19]

Nakada et al.

[11] Patent Number: 5,278,638
[45] Date of Patent: Jan. 11, 1994

[54] NOISE REDUCING CIRCUIT FOR IMAGES

[75] Inventors: Junichi Nakada; Tsutomu Banno, both of Saitama, Japan

[73] Assignee: Pioneer Electronic Corporation, Tokyo, Japan

[21] Appl. No.: 914,521

[22] Filed: Jul. 17, 1992

[30] Foreign Application Priority Data

Sep. 30, 1991 [JP] Japan .................................. 3-252074
Sep. 30, 1991 [JP] Japan .................................. 3-252075

[51] Int. Cl.$^5$ .............................................. H04N 9/64
[52] U.S. Cl. ...................................... 358/36; 358/167
[58] Field of Search ............ 358/36, 37, 358/24; 166, 167, 21R, 115, 314, 336, 340; H04N 9/64

[56] References Cited

U.S. PATENT DOCUMENTS

| | | | |
|---|---|---|---|
| 4,242,704 | 12/1980 | Ito et al. | 358/36 X |
| 4,268,855 | 5/1981 | Takahashi | 358/36 |
| 4,646,138 | 2/1987 | Willis | 358/36 |
| 4,860,104 | 8/1989 | Katsuyama | 358/36 X |
| 4,926,261 | 5/1990 | Matsumoto et al. | 358/36 X |
| 5,177,600 | 1/1993 | Monta et al. | 358/36 X |

Primary Examiner—Victor R. Kostak
Attorney, Agent, or Firm—Sughrue, Mion, Zinn, Macpeak & Seas

[57] ABSTRACT

A noise reducing circuit for video images. A motion detector outputs a first difference between a first video signal and a second image signal. A compensation signal producing circuit generates a compensation signal in accordance with the first difference. The compensation signal is outputted in accordance with a third signal supplied to the compensation signal producing means. A subtracter subtracts the compensation signal from the first video signal to output a second difference between the compensation signal and first video signal. The second difference has the same image information as the first image signal with noise eliminated. An image delaying circuit or memory receives the second difference from the subtracter and outputs a delayed second difference signal. The delayed second difference signal has a delay time of at least one frame and is outputted as the second image signal. A band-pass filter passes frequency components only in a predetermined frequency range either in the first difference signal, in the first video signal, or in the second video signal. A level detector for detecting a level of the frequency components to output the third signal in accordance with the level of the frequency passed by the band-pass filter.

11 Claims, 12 Drawing Sheets

SIGNAL LEVEL

COLOR SIGNAL LEVEL

COLOR SIGNAL LEVEL

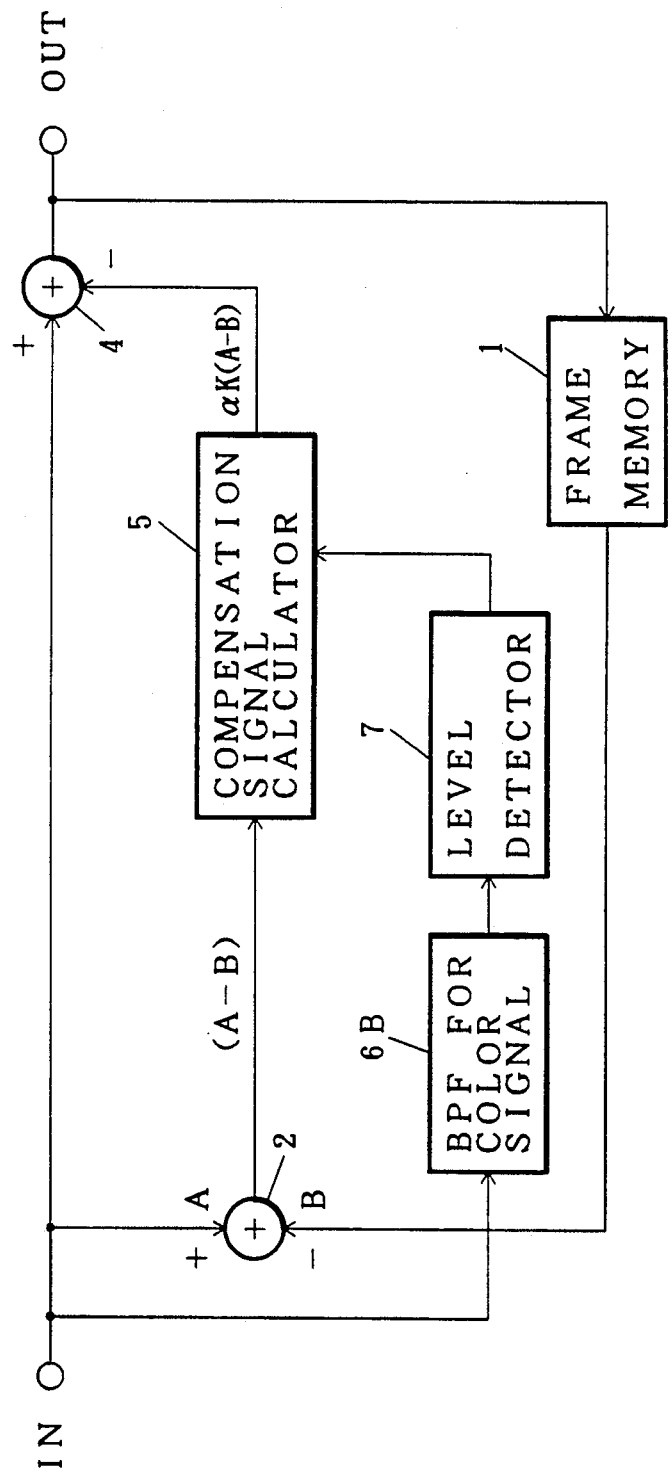

NOISE REDUCING CIRCUIT FOR IMAGES

BACKGROUND OF THE INVENTION

1. Field of the Invention

The present invention relates to a noise-in-image-signal reducing circuit used in video disk players, video tape recorders, and television receivers.

2. Prior Art

Video signals consists of a series of frames which are used in video disk players, video tape recorders, and television receivers. Adjacent frames usually have a high correlation in terms of an image signal but have no correlation in terms of noise components contained in the adjacent frames. Thus, the correlation may be used to eliminate the noise components from the video images by averaging the images between frames with respect to time without any significant change in the signal energy of image.

FIG. 16 shows a prior art noise reducing circuit based on such a principle. In the figure, an input video signal A is delayed one frame by a frame memory 1 and is outputted as a delayed video signal B. A subtracter 2 subtracts the signal B from the signal A to produce the difference A−B in the density of picture element between the two signals A and B. The larger the motion is, the greater the value of A−B. The larger the motion is, the higher the frequency of motion is. A compensation signal calculator 3 receives the difference A−B and produces a compensation signal K(A−B) used for noise reduction where K is a multiplying factor. The compensation signal K(A−B) is then subtracted from the signal A to thereby reduce the noise components in the input video signal A. This type of noise reducing circuit is very effective for still pictures but is disadvantageous for moving pictures in that persistent images are developed in moving portions of an image resulting in blur in that image.

Thus, the value of K is varied in the range of 1≧K≧0 in accordance with the movements of image such that K is large to greatly reduce noise if movements are small, and K is small or zero to reduce noise for less blurred image if movements are rather large. FIG. 17 shows the relation of the difference signal (A−B) versus the compensation signal K(A−B). It should be noted that the K(A−B) is highest at a specific value the value of A−B, i.e., the magnitude of motion. It should be noted that the value of K(A−B) becomes zero for the value of difference signal (A−B) beyond a certain value i.e., when the motion in the image exceeds a predetermined level. This indicates that noise reduction is no longer effective beyond that value, preventing blurred images.

The difference signal (A−B) and corresponding compensation signal K(A−B) are tabulated in a certain relation and are previously stored in a memory such as ROM. Then, the compensation signal K(A−B) is outputted in accordance with the difference signal (A−B), so that the noise in an image is reduced in accordance with the motion of the image.

Experiments by the inventors of the present invention showed that the magnitude of motion in an image is not the only factor to cause a blurred image. The inventors discovered that a more blurred image could be developed for the same magnitude of motion when the frequency of motion falls in a particular frequency range. In order to obtain a high quality image, noise reduction should be controlled not only in accordance with the motion of image but also depending on the magnitude of the particular frequency components of the motion.

Further, as for color images, experiments by the inventors revealed that at high levels of color signal, color noise is more noticeable than blur of the image, and at low levels of color signal blurred image is more detectable than color noise. In order to obtain a high quality image, noise reduction should be controllably applied not only in accordance with the motion of image but also depending on the magnitude of the color signal components.

SUMMARY OF THE INVENTION

An object of the invention is to provide a noise reducing circuit for images which is capable of reducing blurred image noticeable in a particular frequency range for high quality of image.

An object of the invention is to provide a noise reducing circuit for images where color noise is primarily reduced at an image portion having a high color signal level and image is prevented from being noticeably blurred at an image portion having a low color signal level.

A motion detector outputs a first difference between a first video signal and a second image signal. A compensation signal producing circuit generates a compensation signal in accordance with the first difference. The compensation signal is outputted in accordance with a third signal supplied to the compensation signal producing means. A subtracter subtracts the compensation signal from the first video signal to output a second difference between the compensation signal and first video signal. The second difference has the same image information as the first image signal with noise eliminated. An image delaying circuit or memory receives the second difference from the subtracter and outputs a delayed second difference signal. The delayed second difference signal has a delay time of at least one frame and is outputted as the second image signal. A band-pass filter passes frequency components only in a predetermined frequency range either in the first difference signal, in the first video signal, or in the second video signal. A level detector for detecting a level of the frequency components to output the third signal in accordance with the level of the frequency passed by the band-pass filter.

BRIEF DESCRIPTION OF THE DRAWINGS

Features, and other objects of the invention will be more apparent from the detailed description of the preferred embodiments with reference to the accompanying drawings in which:

FIG. 15 shows a fifth embodiment of the invention;

DESCRIPTION OF THE PREFERRED EMBODIMENTS

Video signals are all assumed to be in a digital form throughout the embodiments.

FIRST EMBODIMENT

Figure 1:
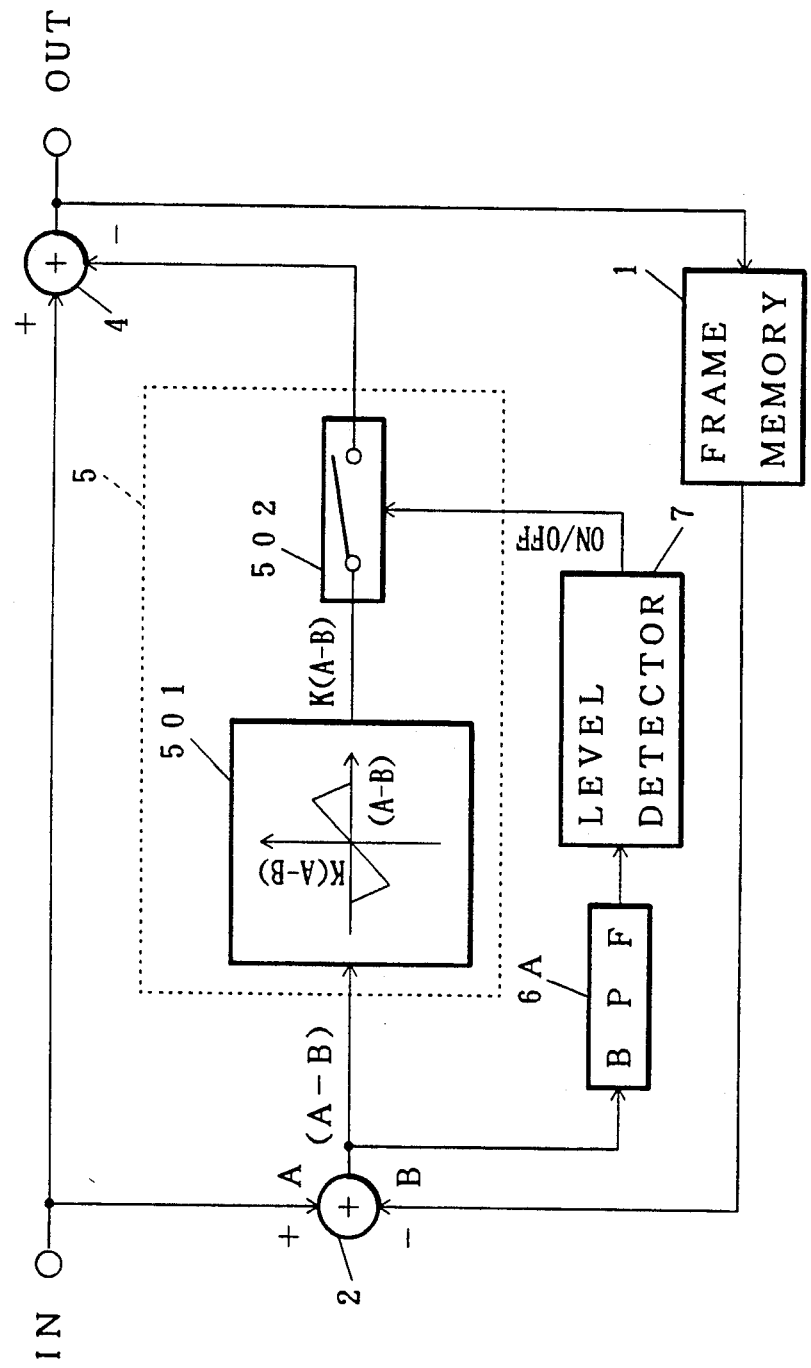
FIG. 1 shows a first embodiment of a noise reducing circuit according to the present invention.
Figure 2:
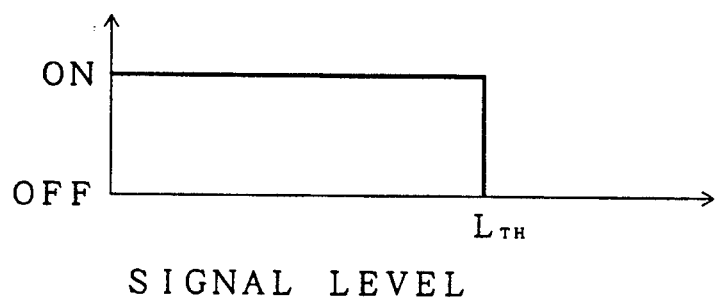
FIG. 2 is the on-off operation of a switch 502 with respect to signal level.
Figure 7:
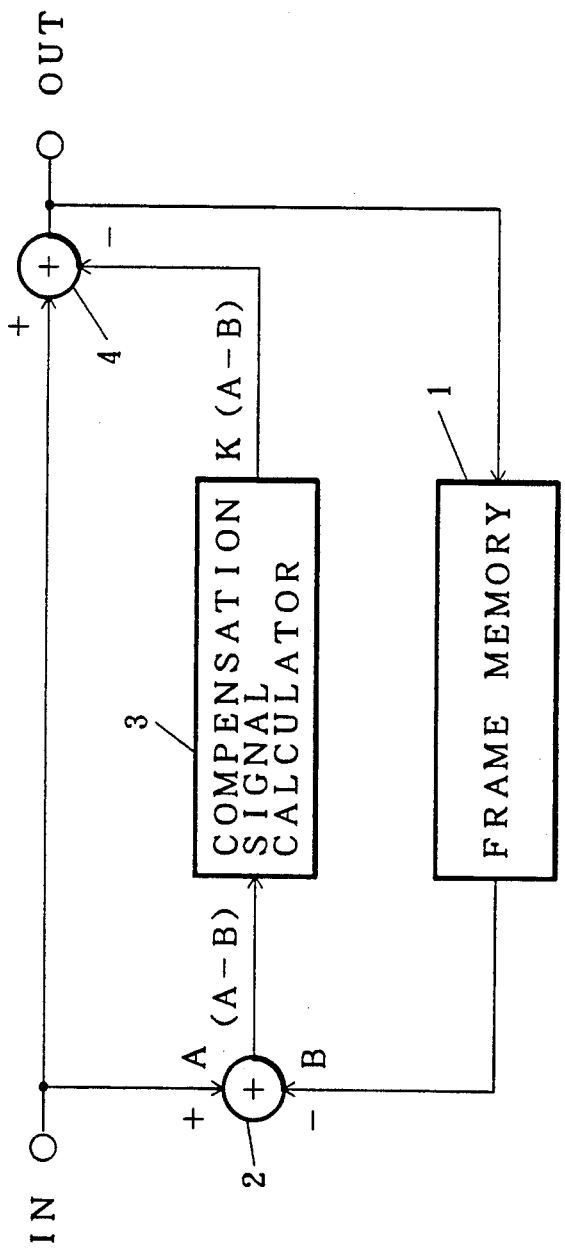
FIG. 7 shows a prior art noise reducing circuit.

Embodiments of the invention will now be described in detail with reference to the drawings. FIG. 1 shows a first embodiment of a noise reducing circuit according to the present invention. In the first embodiment, noise reduction is effected if the level of signal in a predetermined frequency range is above a predetermined threshold. The same elements as the prior art noise reducing circuit in FIG. 7 have been given the same reference numerals.

Figure 8:
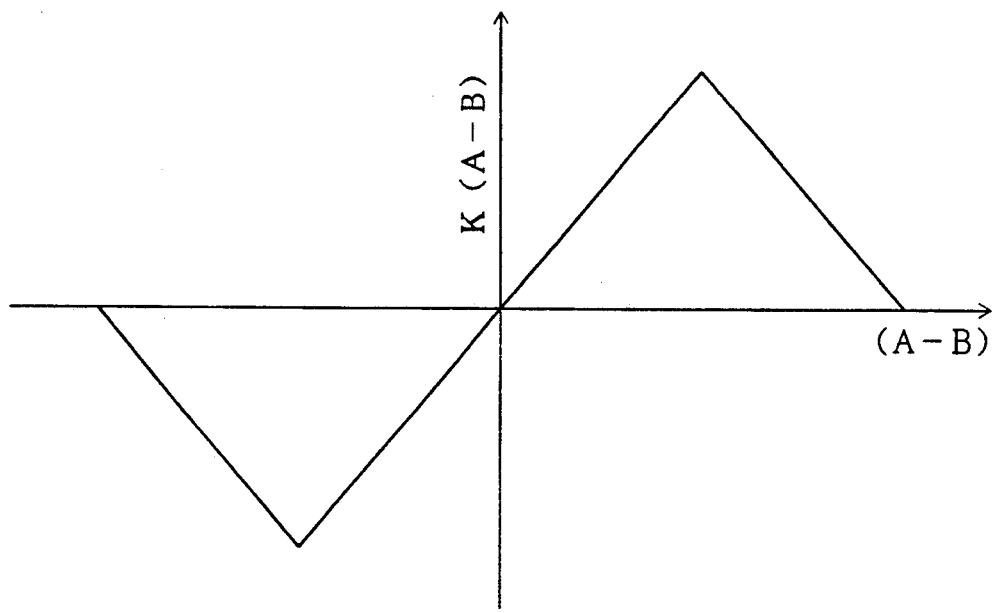
FIG. 8 shows difference signal vs compensation signal characteristic.

In FIG. 1, an image signal in a digital form comes into an input terminal IN. A frame memory 1 outputs a video signal delayed by one frame. A field memory is acceptable instead of a frame memory 1. A subtracter 2 outputs the difference signal $(A-B)$ in the density of picture element between an input video signal A and a one-frame delayed video signal B outputted from the frame memory 1. The subtracter 4 subtracts a compensation signal $K(A-B)$ from the input video signal A. A compensation signal calculator 5 is formed of a switch 502 that effects noise reduction operation when closed, and a table 501 that contains the relation between the difference signal and compensation signal. The table 501 is similar to that of a prior art circuit as shown in FIG. 8, which outputs a compensation signal $K(A-B)$ in accordance with a difference signal $(A-B)$ inputted thereto. The switch 502 is controlled its on-off operation by an ON-OFF control signal from a later described level detector 7. A band-pass filter(BPF) 6 receives the difference signal $(A-B)$ from the subtracter 2 and passes only frequency components of the signal $(A-B)$ in a predetermined frequency range. The BPF has a pass band characteristic designed to pass experimentally determined frequency components that cause detectable blur in an image. Experiments made by the inventors show that the image have detectable blurs at a motion frequency of about 1.8 MHz. Thus, the BPF only needs to pass frequencies about 1.8 MHz. A level detector 7 detects the signal level of frequency components passed by the BPF. The level detector 7 outputs a switch-on signal when the output of BPF is below a predetermined threshold level $L_{th}$ and a switch-off signal when above the threshold level $L_{th}$.

The operation of the first embodiment will now be described.

The frame memory 1 outputs a video signal B delayed by one frame to the subtracter 2 which in turn subtracts the delayed video signal B from the input video signal A to output the difference $(A-B)$ to the compensation signal calculator 5. The compensation signal calculator 5 receives the signal $(A-B)$ and reads the corresponding compensation signal $K(A-B)$ from the table 501 (see FIG. 8). The signal $K(A-B)$ is directed as a noise reduction signal to the switch 502.

Meanwhile, the BPF 6 extracts frequency components about 1.8 MHz from the difference signal $(A-B)$ outputted from the subtracter 2, and sends to the level detector 7 which in turn detects the signal level of the output of BPF. The circuit 7 outputs a switch-on signal if the output of BPF is below a predetermined threshold $L_{th}$ and a switch-off signal if above the threshold $L_{th}$.

Thus, when the output of BPF is below the threshold $L_{th}$, the switch 502 is switched on so that the compensation signal $K(A-B)$ is directed to the threshold $L_{th}$, and the switch 502 is switched off so that the compensation signal $K(A-B)$ is not directed to the subtracter 4.

In this manner, noise reduction operation is effected for image portions having blur-causing frequency components less than the threshold level $L_{th}$, eliminating noise in the image without causing detectable blur in the image. Noise reduction operation is not effected for image portions having blur-causing frequency components greater than the threshold level $L_{th}$, preventing a detectable blur in the image which would otherwise result due to noise reduction operation.

An optimum threshold $L_{th}$ may be experimentally determined in terms of the visual evaluation by a viewer. While the switch 502 is connected with the output of the table 501 but the switch 502 may also be placed in front of the table 501.

SECOND EMBODIMENT

Figure 3:
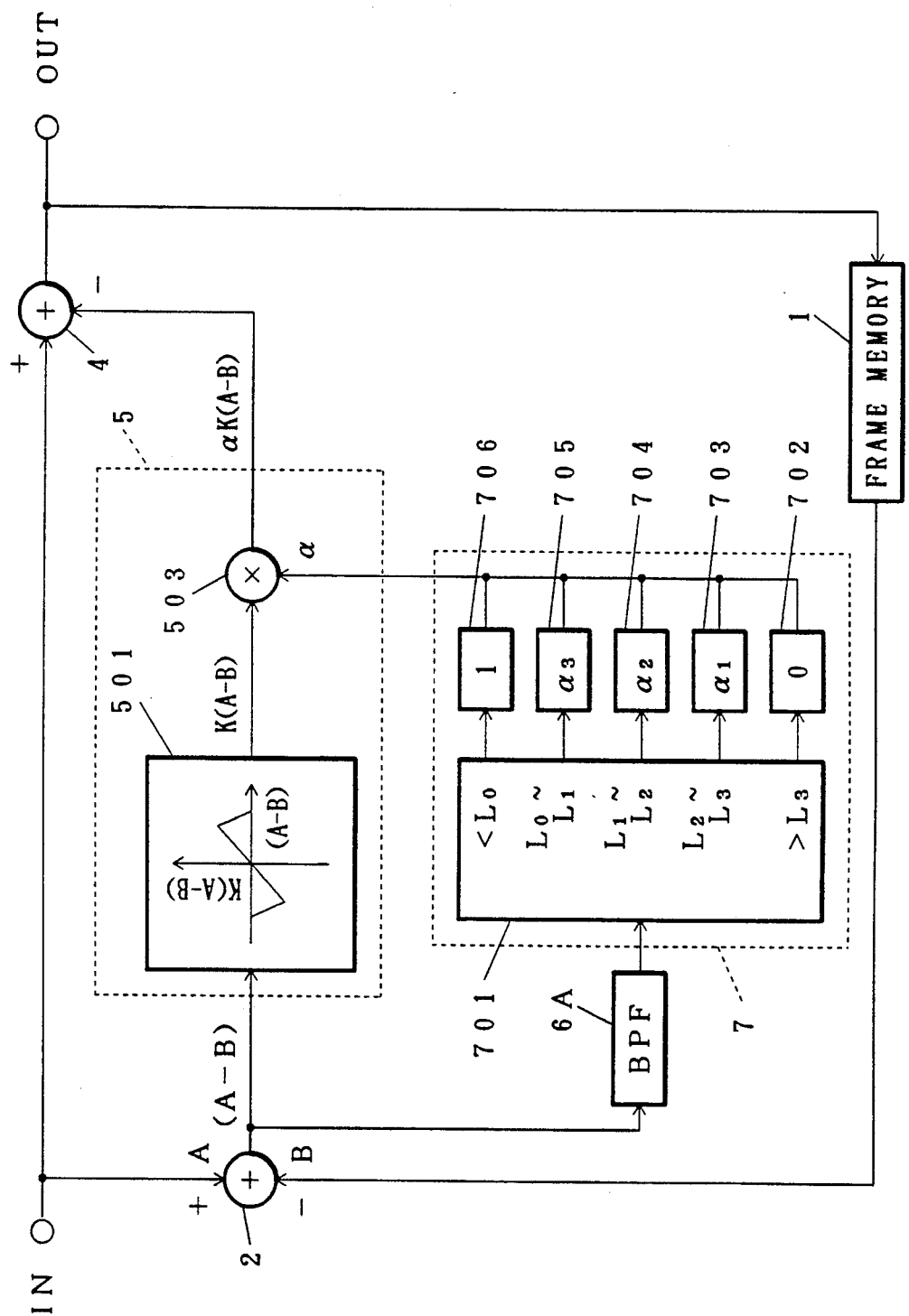
FIG. 3 shows a second embodiment of a noise reducing circuit of the invention.

FIG. 3 shows a second embodiment of a noise reduction circuit according to the present invention. The second embodiment is a modification to the first embodiment where the noise reduction operation is effected stepwise in accordance with the output of BPF. In the second embodiment, the level detector 7 includes a window comparator 701 and a plurality of multiplying factor generators 702-706. A multiplier 503 is connected with the output of the table 501 and multiplies the compensation signal $K(A-B)$ by one of multiplying factors.

The window comparator 701 detects the level of the output of BPF in five steps, for example, below $L_0$, $L_0$-$L_1$, $L_1$-$L_2$, $L_2$-$L_3$, above $L_3$.

Then, the window comparator 701 outputs a logic 1 to a multiplying factor generator corresponding to the detected level.

Figure 4:
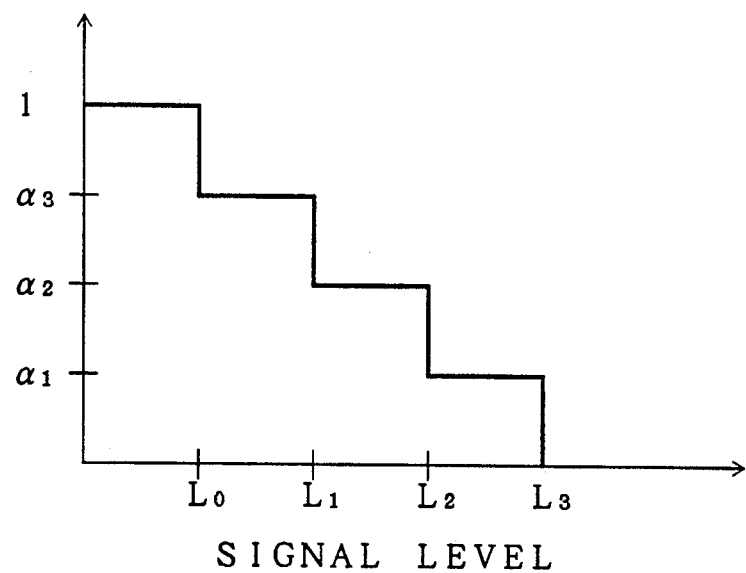
FIG. 4 shows the relation between the color signal levels and multiplication factors in five steps.

The respective multiplying factor generators have predetermined multiplying factors $\alpha$ e.g., 0, $\alpha 1$, $\alpha 2$, $\alpha 3$, and 1 as shown in FIG. 4.

The operation of the second embodiment will now be described.

The window comparator 701 detects the level of the output of BPF so as to select corresponding one of the multiplying factor generators 702-706.

The selected multiplying factor generator outputs a multiplying factor $\alpha$ to the multiplier 503 which in turn multiplies the compensation signal $K(A-B)$ by the multiplying factor $\alpha$ to output a signal $\alpha K(A-B)$ as an ultimate noise reducing signal to the subtracter 4.

Figure 5:
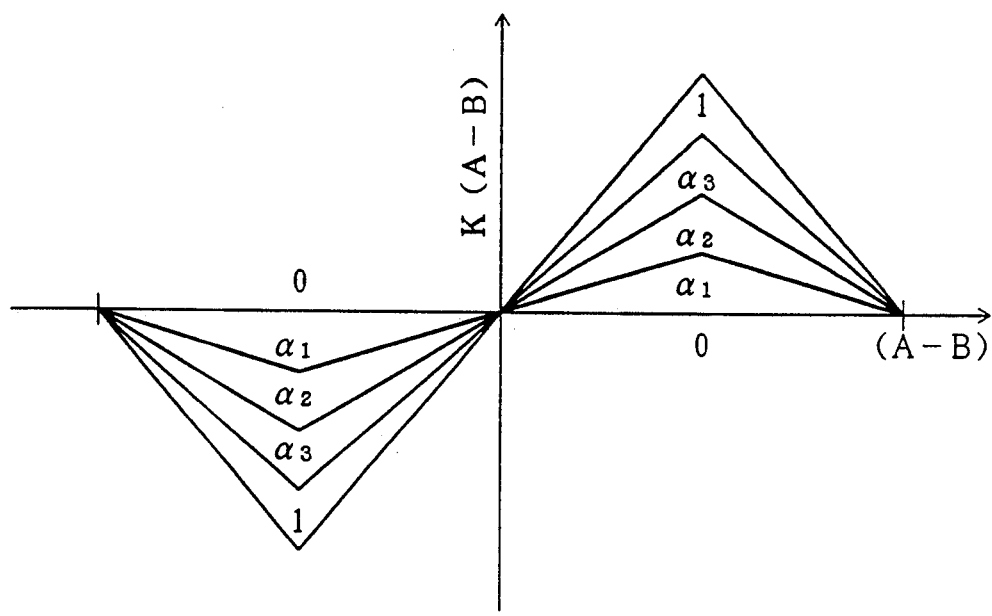
FIG. 5 shows the relation between difference signal and compensation signal in terms of multiplying factors.

FIG. 5 shows overall characteristics of the ultimate compensation signal $\alpha K(A-B)$ outputted from the multiplier 503 for various multiplying factors. Thus, the ultimate compensation signal $\alpha K(A-B)$ varies in accordance with multiplying factor corresponding to the degree of blur of image.

Figure 6:
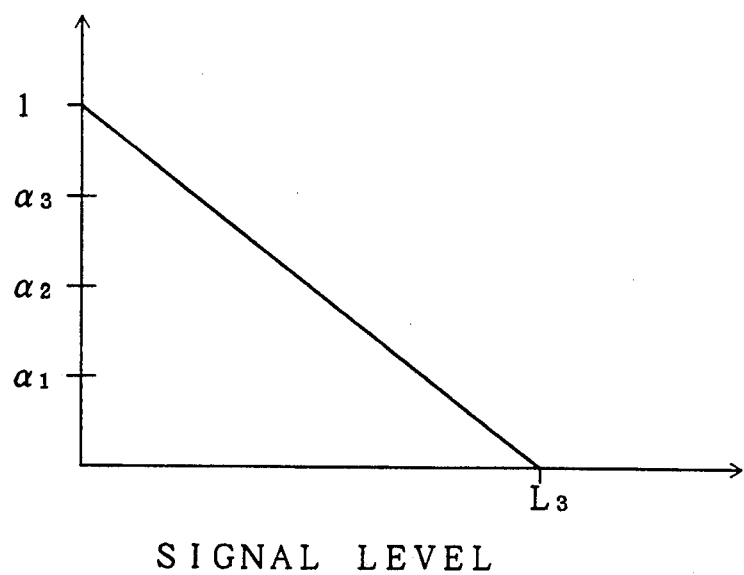
FIG. 6 shows another example of the relation between signal level and multiplying factor.

The second embodiment has been described in terms of stepwise multiplying factors $\alpha$ as shown in FIG. 4, but the multiplying factors may be arranged to continuously vary as shown in FIG. 6. In this case, the value of $\alpha K(A-B)$ may be continuously varied in accordance with the values of $\alpha$.

The center frequency of BPF may be set to other frequency than 1.8 MHz depending on the specific purpose of the noise reducing circuit.

THIRD EMBODIMENT

Figure 9:
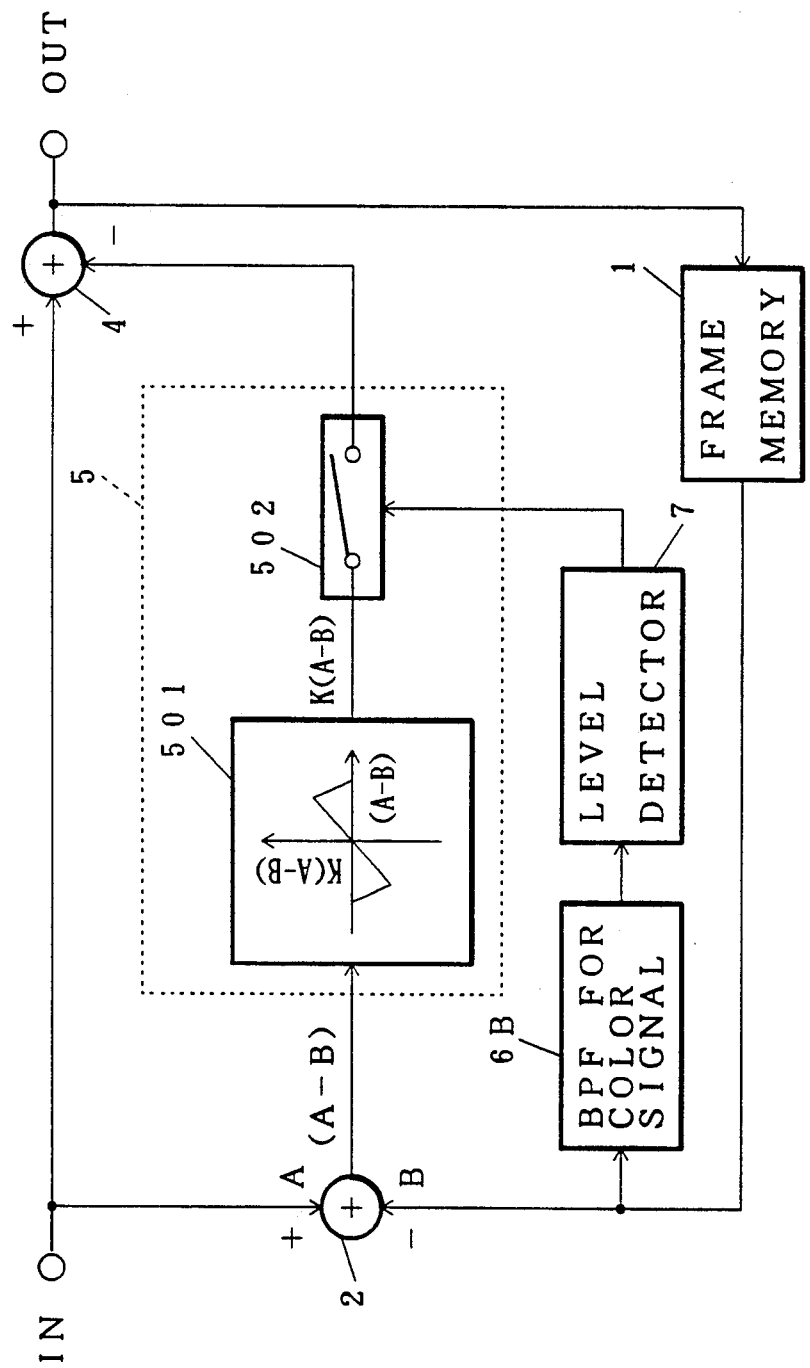
FIG. 9 shows a third embodiment of the invention.

FIG. 9 shows a third embodiment of the invention. The third embodiment is similar to the first embodiment except that the whole circuit operates to reduce color noise. A BPF 6B is a band-pass filter for extracting color signal(C signal) components from the delayed video signal outputted from the frame memory 1. The BPF 6B may take the form of a comb filter, which is the same type of filter used in separating Y signal and C signal from each other. The band-pass filter (BPF) 6B receives the delayed video signal B from the frame memory 1 and passes only color signal components to a level detector 7. The level detector 7 detects the signal level of color signal components passed by the BPF, and outputs a switch-on signal when the output of BPF, i.e., C signal is above a predetermined threshold level $C_{th}$ and a switch-off signal when below the threshold level $C_{th}$.

The operation of the third embodiment will now be described.

The frame memory 1 outputs a video signal B delayed by one frame to the subtracter 2 which in turn subtracts the delayed video signal B from the input video signal A to output the difference $(A-B)$ to the compensation signal calculator 5. The compensation signal calculator 5 receives the signal $(A-B)$ and reads the corresponding compensation signal $K(A-B)$ from the table 501 (see FIG. 8). The signal $K(A-B)$ is supplied as a compensation signal to the switch 502.

Figure 10:
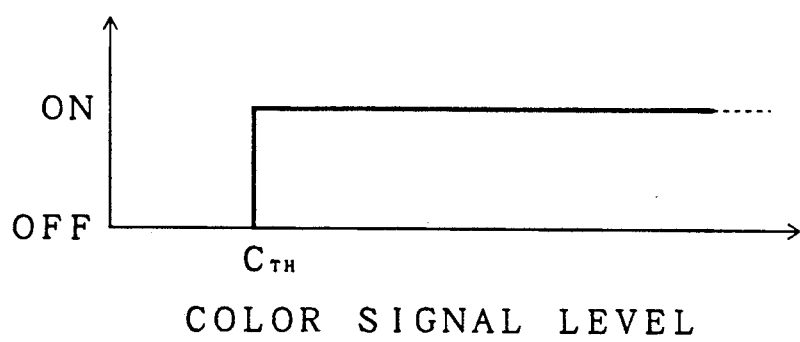
FIG. 10 is the on-off operation of a switch 502 with respect to signal level.

Meanwhile, the BPF 6B extracts color signal components from the delayed video signal B outputted from the frame memory 1 and supplies it to the level detector 7 which in turn detects the signal level of the output of BPF so as to output a switch-on signal, as shown in FIG. 10, if the output of BPF is above a predetermined threshold $C_{th}$ and a switch-off signal if below the threshold $C_{th}$.

Thus, the switch 502 is switched on when the output of BPF is above the threshold $C_{th}$ so that the compensation signal $K(A-B)$ is directed to the subtracter 4, and the switch 502 is switched off when below the threshold $C_{th}$ so that the compensation signal $K(A-B)$ is not directed to the subtracter 4.

In this manner, noise reduction operation is effected for image portions where color signal level is greater than the threshold level $C_{th}$, eliminating color noise in the image. Noise reduction operation is not effected for image portions where color signal level is less than the threshold level $C_{th}$, preventing detectable blur in the image.

An optimum threshold $C_{th}$ may be experimentally determined in terms of the visual evaluation by a viewer. While the switch 502 is connected with the output of the table 501, the switch 502 may also be placed in front of the table 501.

FOURTH EMBODIMENT

Figure 11:
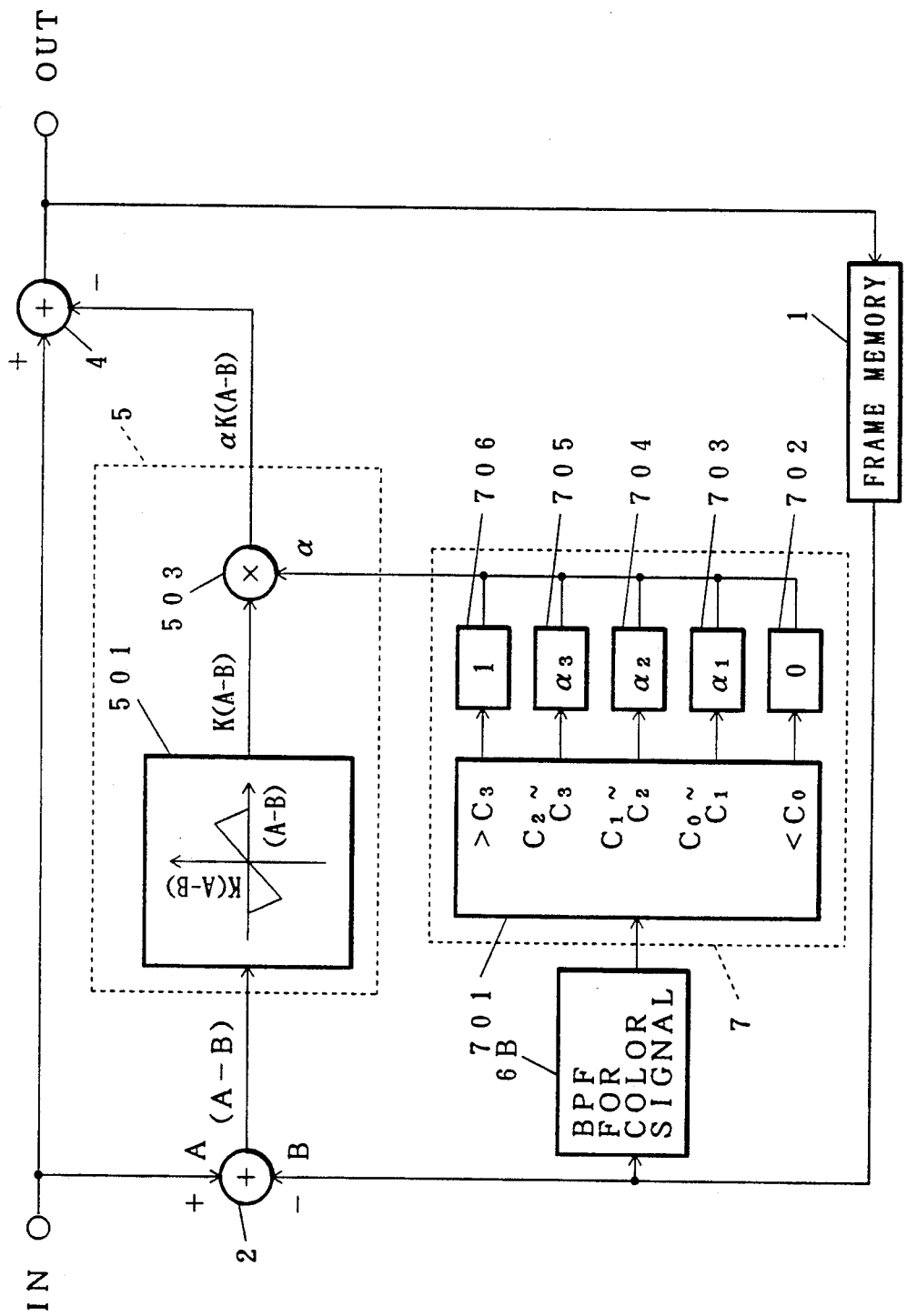
FIG. 11 shows a fourth embodiment of a noise reduction circuit according to the present invention.

FIG. 11 shows a fourth embodiment of a noise reduction circuit according to the present invention. The fourth embodiment is a modification to the third embodiment where the noise reduction operation is effected stepwise in accordance with the output of BPF, i.e., the level of color signal components. In the fourth embodiment, the level detector 7 includes a window comparator 701 and a plurality of multiplying factor generators 702-706. A multiplier 503 is connected with the output of the table 501 and multiplies the compensation signal $K(A-B)$ by one of multiplying factors.

Figure 12:
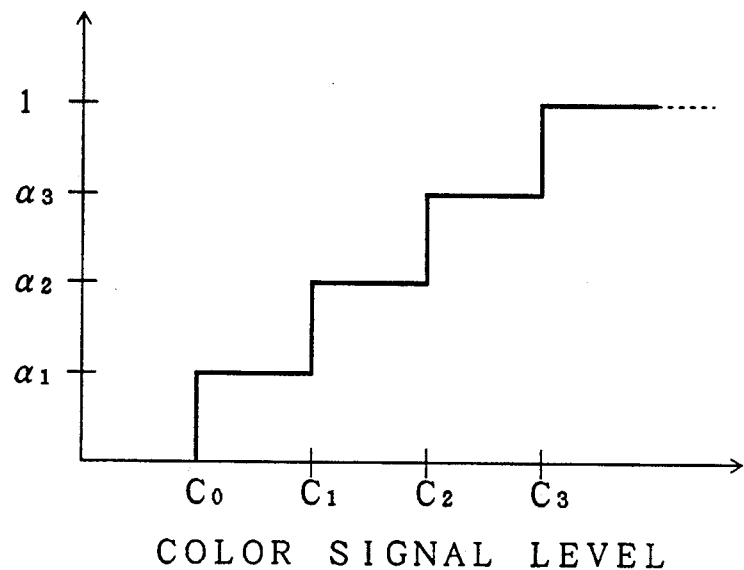
FIG. 12 shows the relation between the color signal levels and multiplication factors in five steps.

The window comparator 701 detects the level of color signal or output of BPF in five steps, for example, below $C_0$, $C_0$-$C_1$, $C_1$-$C_2$, $C_2$-$C_3$, above $C_3$ as shown in FIG. 12.

Then, the window comparator 701 outputs a logic 1 to a multiplying factor generator corresponding to the detected level.

The respective multiplying factor generators have predetermined multiplying factors $\alpha$ e.g., 0, $\alpha 1$, $\alpha 2$, $\alpha 3$, and 1, one of which is selected and is supplied to the multiplier 503.

The operation of the fourth embodiment will now be described.

The window comparator 701 detects the level of the color signal components extracted by the BPF 6B so as to select corresponding one of the multiplying factor generators 702-706.

The selected multiplying factor generator outputs a multiplying factor $\alpha$ to the multiplier 503 which in turn multiplies the compensation signal $K(A-B)$ by the supplied multiplying factor $\alpha$ to output a signal $\alpha K(A-B)$ as an ultimate noise reducing signal to the subtractor 4.

Figure 13:
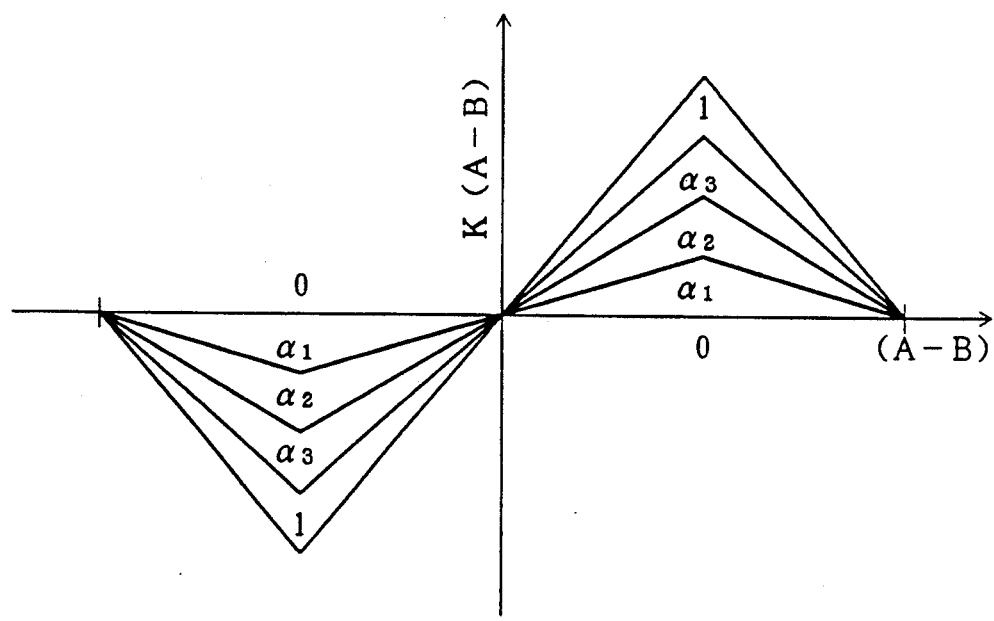
FIG. 13 shows overall characteristics of the ultimate compensation signal $\alpha K(A-B)$ outputted from the multiplier 503 for various multiplying factors.
Figure 14:
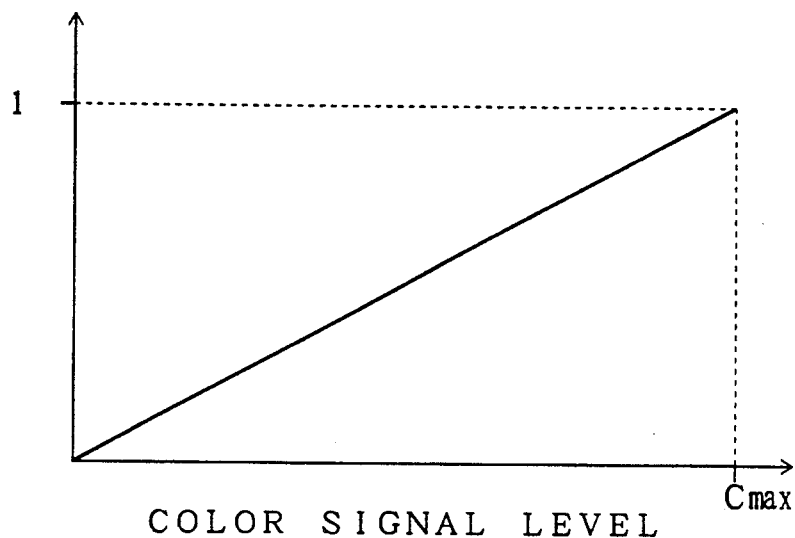
FIG. 14 shows multiplying factors $\alpha$ arranged to continuously vary.
Figure 17:
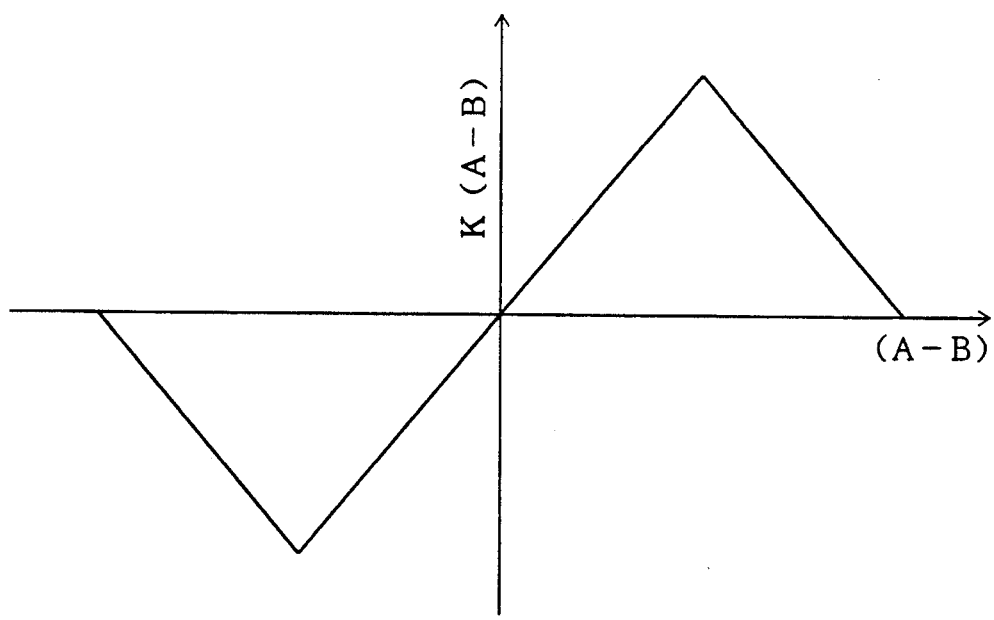
FIG. 17 shows the relation of the difference signal-$(A-B)$ versus the compensation signal $K(A-B)$.
Figure 16:
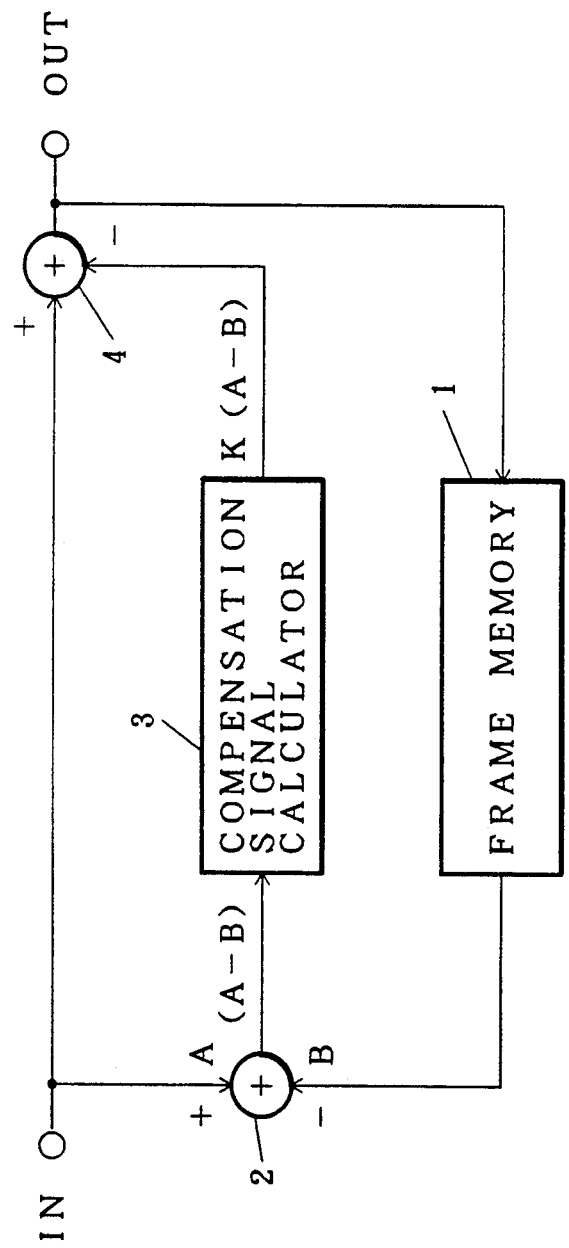
FIG. 16 shows a prior art noise reducing circuit based on such a principle.

FIG. 13 shows overall characteristics of the ultimate compensation signal $\alpha K(A-B)$ outputted from the multiplier 503 for various multiplying factors. Thus, the ultimate compensation signal $\alpha K(A-B)$ varies in accordance with the multiplying factor, i.e., the level of color signal components corresponding to the degree of blur of image.

FIFTH EMBODIMENT

FIG. 15 shows a fifth embodiment of the invention. In the fifth embodiment, the BPF 6B is directly connected to the input video signal and passes only color signal components of the input video signal so that the noise reduction operation is carried out in accordance with the color signal level of the input video signal. The rest of the circuit configuration is the same as that of the third and fourth embodiments.

What is claimed is:

1. A noise reducing circuit for video images comprising:
   motion detecting means for outputting a first difference between a first image signal and a second image signal;
   compensation signal producing means for generating a compensation signal in accordance with said first difference, said compensation signal being outputted in accordance with a third signal supplied to said compensation signal producing means;

subtracting means for subtracting said compensation signal from said first image signal to output a second difference between said compensation signal and said first image signal, said second difference having the same image information as said first image signal with noise eliminated therefrom;

image delaying means for receiving said second difference from the subtracting means and outputting a delayed second difference signal, said delayed second difference signal having a delay time of at least one field and being outputted as said second image signal;

extracting means for extracting frequency components in a predetermined frequency range of said first difference outputted from said motion detecting means;

level detecting means for detecting a level of said frequency components to output said third signal in accordance with the level of said frequency components.

2. A noise reducing circuit for video images according to claim 1, wherein said third signal is a binary signal having a first state and a second state, said compensation signal is outputted when said third signal is in said first state, and said compensation signal is not outputted when said third signal is in said second state.

3. A noise reducing circuit for video images according to claim 1, wherein said third signal has different values depending on said level of the frequency components extracted by said extracting means, and said compensation signal producing means outputs said compensation signal multiplied by said third signal.

4. A noise reducing circuit for video images according to claim 3, wherein said different values of said third signal are stepwise in level change depending on said level of frequency components extracted by said extracting means.

5. A noise reducing circuit for video images according to claim 3, wherein said different values of said third signal are continuous in level change depending on said level of frequency components extracted by said extracting means.

6. A noise reducing circuit for video images comprising:

motion detecting means for outputting a first difference between a first image signal and a second image signal;

compensation signal producing means for generating a compensation signal in accordance with said first difference, said compensation signal being outputted in accordance with a third signal supplied to said compensation signal producing means;

subtracting means for subtracting said compensation signal from said first image signal to output a second difference between said compensation signal and said first image signal, said second difference having the same image information as said first image signal with noise eliminated therefrom;

image delaying means for receiving said second difference from the subtracting means and outputting a delayed second difference signal, said delayed second difference signal having a delay time of at least one field and being outputted as said second image signal;

extracting means for extracting color signal components from an image signal;

level detecting means for detecting a level of said color signal components to output said third signal in accordance with the level of said color signal components.

7. A noise reducing circuit for video images according to claim 6, wherein said extracting means extracts said color signal components from said first image signal.

8. A noise reducing circuit for video images according to claim 6, wherein said extracting means extracts said color signal components from said second image signal.

9. A noise reducing circuit for video images according to claim 6, wherein said third signal is a binary signal having a first state and a second state, said compensation is outputted when said third signal is in said first state, and said compensation signal is not outputted when said third signal is in said second state.

10. A noise reducing circuit for video images according to claim 6, said third signal has different values depending on said level of the frequency components extracted by said extracting means, and said compensation signal producing means outputs said compensation signal multiplied by said third signal.

11. A noise reducing circuit for video images according to claim 10, wherein said different values of said third signal are stepwise in level depending on said level of frequency components extracted by said extracting means.

* * * * *